G. H. F. BERGLUND.
MILKING MACHINE.
APPLICATION FILED JULY 1, 1912.
1,128,574.
Patented Feb. 16, 1915.
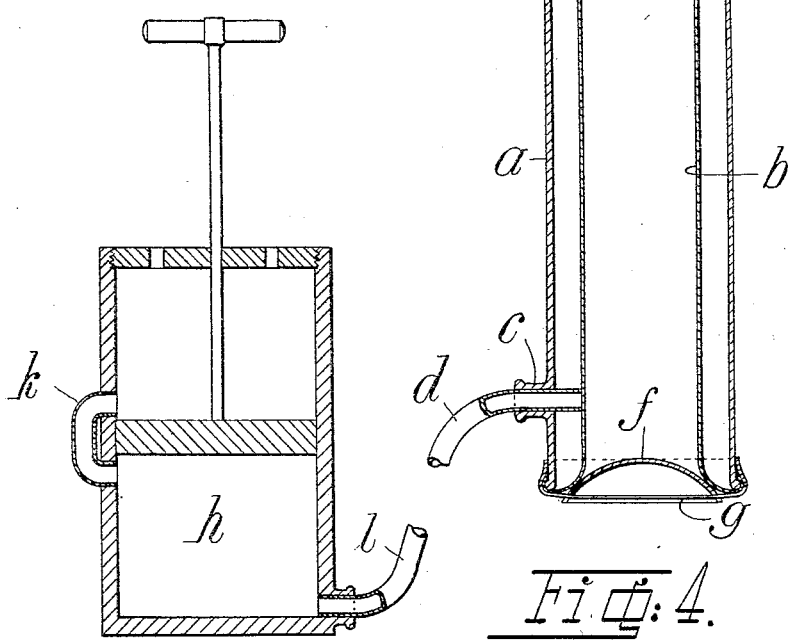
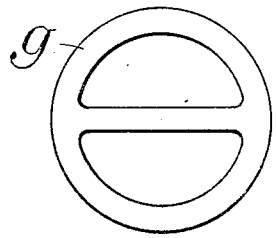
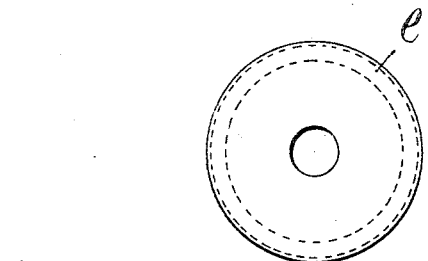
WITNESSES:
John C. Sanders
Albert F. Steuman
INVENTOR:
Gustaf Henrik Fabian Berglund
By

UNITED STATES PATENT OFFICE.

GUSTAF HENRIK FABIAN BERGLUND, OF STOCKHOLM, SWEDEN.

MILKING-MACHINE.

1,128,574.  Specification of Letters Patent.  Patented Feb. 16, 1915.

Application filed July 1, 1912. Serial No. 707,074.

*To all whom it may concern:*

Be it known that I, GUSTAF HENRIK FABIAN BERGLUND, subject of the King of Sweden, residing at Valhallavagen 83, Stockholm, Sweden, have invented new and useful Improvements in Milking-Machines, of which the following is a specification.

This invention relates to a practical milking machine, which in comparison with such already known affords, in the same machine, the advantages of a cheaper manufacture, simpler construction, easier manageability, greater lightness and less sensitiveness, greater security against a detrimental effect upon the animal and cheaper driving means.

A form of the invention is illustrated on the annexed drawing, in which—

Figure 1 is a diagrammatical vertical section of the driving apparatus, Fig. 2 a teat tube with parts belonging thereto also in vertical section and Figs. 3–5 details.

For each teat the milking machine possesses a tube $a$ (Fig. 2), surrounding an elastic sleeve $b$ of india rubber or the like with a less diameter than the tube. This sleeve is bent over both ends of the tube and fixed in a suitable manner, whereby a teat tube with double walls is formed. Near the lower end the tube is provided with an opening $c$, in which a hose $d$ is inserted the inner mouth of which is in contact with the elastic sleeve $b$. The hose is connected to the tube.

The upper mouth of the teat tube $a$ is covered by a cap $e$ of elastic material consisting of an india rubber plate provided with a central-opening and having its edge turned over the upper edge of the teat tube and tightly surrounding it. The lower mouth of the teat tube is closed by a bottomplate $f$, which is tightly pressed against the edge of the tube by means of an india rubber plate $g$ or the like in such a manner, however, that the joint between the bottom plate and the tube is not covered.

The driving apparatus (Fig. 1) consists of a vacuum pump $h$ connected to the teat tubes and having an oscillating piston, at the movements of which the constant quantity of air inclosed is alternately rarefied and compressed. For the purpose of regulating the quantity of air in this pump (viz. to compensate for leakage, etc.) the pump at every stroke is connected with the outer air for instance by a pipe $k$, connecting the chambers on both sides of the piston. This regulation, however, of course may also be effected by means of suction- and pressure-valves.

The teat tubes are connected mutually by means of a mouth piece (not shown on the drawing) and with the pump by means of a hose $l$. They are placed upon the teats during the working of the pump in such a manner, that the openings in the caps $e$ are pressed against the tops of the teats, whereby the teat tubes are sucked up against the udder and are held in place by the action of the said caps.

The air inclosed in the pump $h$ and between the walls $a$, $b$ of the teat-tubes becomes periodically compressed and rarefied, at the action of the pump, and produces hereby a corresponding compression and rarefaction of the air in the teat tubes, thus alternately sucking the milk from the teats and forcing it out through the joint between the bottom $f$ and the lower edge of the sleeve $b$, the said joint of course being tight during the suction. The sleeve $b$ in the teat tube hereby acts about as the diaphragm in a diaphragm pump. The teat will be exposed to an alternating expansion and contraction, whereby the circulation in it is maintained normal. The movement of the teat tube becomes as similar as possible to the sucking of the calf. The quantity of milk sucked and forced out at every time it limited thereby, that in a certain moment the milk by its pressure upon the lower part of the sleeve closes the mouth of the hose $d$, thereby breaking off the connection with the conduit to the pump. When the udder and the teat are filled with milk there is quite tight joint between the teat and the edge of the opening in the cap $e$, but according as the cow is milked out, this tight joint successively decreases and at last almost ceases, when the teat is emptied, whereby the outer air is forced in the teat tube and the mouth of the hose $d$ is closed, so that the suction does not reach its maximum and the teat is not strained unnecessarily. The milk flows into a receiver placed under or at the side of the cow, either directly or through a conduit or the like provided with a collector.

Having now particularly described the nature of my invention and the manner of its operation, what I claim is:

1. In pneumatic milking machines operating alternately with suction and pressure a teat tube comprising a bottom, a rigid outer wall, an inner wall having a smooth inside and being sufficiently thin and elastic to embrace the teat tightly when pressed against it, and a hose projecting inward through a hole in the outer wall so as to touch the inner one with its mouth.

2. In pneumatic milking machines operating alternately with suction and pressure a teat tube, comprising a rigid outer wall, an inner wall having a smooth inside and being sufficiently thin and elastic to embrace the teat tightly when pressed against it, and a bottom which is resiliently affixed to the tube so as to leave an opening between them under the action of the pressure from the milk.

3. In pneumatic milking machines operating alternately with suction and pressure a teat tube, comprising a rigid outer wall, an inner wall having a smooth inside and being sufficiently thin and elastic to embrace the teat tightly when pressed against it, a bottom consisting of a spherical calotte with its convex side upward, and an elastic annular piece secured to the teat tube and having a diametrical bridge piece resting in two notches of the calotte so as to hold the latter resiliently against the teat tube.

In testimony whereof I have signed my name to this specification in the presence of two subscribing witnesses.

GUSTAF HENRIK FABIAN BERGLUND.

Witnesses:
H. HAMMAR,
CONTA PRIM.

Copies of this patent may be obtained for five cents each, by addressing the "Commissioner of Patents, Washington, D. C."